United States Patent [19]

Proux et al.

[11] Patent Number: 4,496,691

[45] Date of Patent: Jan. 29, 1985

[54] ADDITIVES FOR LUBRICATING OILS CONTAINING STYRENE AND HEAVY $C_{12}$-$C_{20}$ ALKYL ESTERS OF METHACRYLIC ACID, PREPARATION METHOD AND APPLICATIONS

[75] Inventors: Yves Proux, Paris; Alain Perron, Herblay, both of France

[73] Assignee: Societe Francaise d'Organo-Synthese, Gennevilliers, France

[21] Appl. No.: 338,001

[22] Filed: Jan. 8, 1982

[30] Foreign Application Priority Data

Jan. 12, 1981 [FR] France .................................. 81 00410

[51] Int. Cl.³ ........................ C08L 39/04; C08L 51/00
[52] U.S. Cl. .................................... 525/73; 252/56 R; 525/85; 525/86; 525/96; 525/260; 525/263; 525/279; 525/281
[58] Field of Search ...................... 526/258; 252/56 R; 525/203, 279, 281, 260, 263, 96, 73, 85, 86

[56] References Cited

U.S. PATENT DOCUMENTS

| | | | |
|---|---|---|---|
| 3,390,089 | 6/1968 | Tirtiaux et al. | 252/56 R |
| 4,073,738 | 2/1978 | Ladenberger et al. | 252/56 R |
| 4,123,368 | 10/1978 | Leister et al. | 252/56 R |

*Primary Examiner*—Jacob Ziegler
*Attorney, Agent, or Firm*—Weingarten, Schurgin, Gagnebin & Hayes

[57] ABSTRACT

The present invention relates to additives for lubricating oils, constituted by a copolymer prepared from 35–55%, and preferably 40–50%, of substituted or non-substituted styrene monomers, and from 65–45%, and preferably 60–50% of heavy $C_{12}$–$C_{20}$ alkyl esters of methacrylic acid, of which at least 80% consist of $C_{16}$–$C_{20}$ alkylmethacrylates, said copolymer having a polydispersity which is as low as possible, a parameter of solubility close to that of the oil for which the additives are intended and a molecular weight of between 80,000 and 200,000 and being able, moreover, to be modified by a comonomer and vinyl compounds. One application of the invention is the formulation of lubricating oils.

18 Claims, No Drawings

ADDITIVES FOR LUBRICATING OILS CONTAINING STYRENE AND HEAVY $C_{12}$–$C_{20}$ ALKYL ESTERS OF METHACRYLIC ACID, PREPARATION METHOD AND APPLICATIONS

The present invention relates to additives for lubricating oils based on styrene-containing compounds and heavy alkyl esters of methacrylic acid, possibly modified by an additional comonomer and by grafting of vinyl compound(s), to their applications in improving the properties of such oils, and to the method for preparing same.

The technical field which is considered here is that of macromolecular compounds, and more particularly of polymerization products as well as that of lubricating compositions.

Motor oils are required to have a viscosity which remains as constant as possible through a wide range of temperatures, and a low pour point. The aim is therefore to find additives which will give to oils a high viscosity index (VI), and strong thickening properties, which can be limited by the stresses due to the mechanical shearing strength. Other characteristics may also be sought, such as a dispersing power at high and low temperature.

Many oil additives are known to have some of the aforesaid properties but, on the other hand, they do nothing to improve the other characteristics required from oils. For example, heavy poly-methacrylic acid esters retain the viscosity with the temperature and lower the pour point of the oil, but, on the other hand, they have a limited thickening power. On the contrary, polyolefins such as ethylene-propylene copolymers or hydrogenated diene/styrene copolymers have a better thickening power.

Attempts have already been made to regroup the properties of the polyesters of methacrylic acid and the diene-styrene compounds, but these have proved incompatible and mixing them gives rise to decanting.

It is possible to carry out a radical grafting in oily phase of heavy esters of methacrylic acid either on a polyolefin or on a hydrogenated diene-styrene copolymer. The resulting product is found to have no better properties than those of polyesters of methacrylic acid or of polyolefins, individually. On the contrary, these polymers are then compatible with the hydrocarbon macromolecule used for grafting, the mixtures thus obtained having an increased efficiency.

From the practical standpoint, such a method has proved difficult to perform: the hydrogenated styrene or olefin copolymers need to be prepared. Then the esters of methacrylic acid have to be grafted and the mixture with the polyolefins is carried out thereafter.

The problem to be solved is to regroup all the essential properties in one product intended to improve the characteristics of a lubricating oil.

This object is attained in the present invention which proposes additives with properties at least equivalent to those of the polyesters of methacrylic acid and compatible with styrene polymers. Such additives are constituted by copolymers based on substituted or non-substituted styrene and at least one heavy $C_{12}$–$C_{20}$ alkyl ester of methacrylic acid, the percentage by weight of styrene monomers in relation to the total weight of the constituents, being between 35 and 55%, and preferably between 40 and 50%.

Preferred additives are copolymers based on styrene and heavy alkyl ester(s) of methacrylic acid selected from the $C_{16}$–$C_{20}$ and $C_{12}$–$C_{15}$ alkyl groups; the percentage by weight of $C_{16}$–$C_{20}$ alkyl ester of methacrylic acid in relation to the total weight of esters of methacrylic acid is at least about 80%. The copolymer is constituted by moieties of styrene and of heavy esters of methacrylic acid linking as regularly as possible and having as low a polydispersity as possible, a parameter of solubility approaching that of the oil for which it is intended, and a a weight mean of molecular weight ($\overline{M}_w$) between 80,000 and 200,000 (G.P.C. method based on standard polystyrene).

Table I hereinafter gives the composition and certain properties of such additives. The preferred additives are seen to be terpolymers of the cetyl ester of methacrylic acid (50%)/lauryl ester of methacrylic acid (10%)/styrene (40%) type. The two tests referenced Pe 529 an LCMc 1295 correspond to two separate operators, which explains the slight difference between the numerical results.

Table I also shows that a proportion of 100% of $C_{16}$–$C_{20}$ alkyl ester of methacrylic acid (with respect to the esters of methacrylic acid) [references Pe 511 and Pe 525] does not give the best results, particularly when the styrene content is simultaneously low [Pe 511], which leads to a very high sensitivity to shearing stresses ($\tau=26.6$), this rendering the product inacceptable despite the very good thickening power (E=3.6).

In this specification, the following abbreviations will have the following meanings:

MA Ce: (cetyl) $C_{16}$–$C_{20}$ alkyl esters of methacrylic acid

MA Lau: (lauryl) $C_{12}$–$C_{15}$ alkyl esters of methacrylic acid

MADAME: ester of methacrylic acid and dimethylaminoethanol

Mw: weight mean of molecular weight

E: thickening power in 200N (quantity of pure additive necessary for obtaining 14 mm2/s or cSt at 100° C.=weight of copolymer/total weight)

$\tau$: Orbahn shearing rate (DIN 51382)

PP: pour point (°C.) [AFNOR standard P60105]

Dp: dispersing power measured by spot test at 220° C.

A2EH: 2-ethylhexyl acrylate

VIE: index of viscosity

NVP: N-vinylpyrrolidone

NVI: N-vinylimidazole

The spot test for dispersing power is conducted in empiric manner according to the method summed up hereunder.

The following operations are conducted:

weighing between 0.16 g and 0.21 g of additive to be tested and then completing with sludge containing 1% of charcoal-containing material to obtain a concentration of 4, 2, 1 and 0.5%.

heating up to 220° C. for 2 hours, and depositing 1 drop of each product on the Durieux 122bis paper.

measuring the dispersing power 24 hours later with a standard scale according to the following norms:

5: very good dispersing power

4: good dispersing power (the centre of the deposited spot is seen)

3: average dispersing power

2: mediocre dispersing power

1: very poor dispersing power (the spot does not spread but goes through the paper)

0: no dispersing power.

The first figure on the left gives the dispersing power of the solution concentrated at 4%; for Pe 538, it is 5, 4 indicating the dispersing power at 0.5% (cf. Table III).

If the first three figures on the left are not equal to 5, the product is inefficient as dispersant. As to the figure on the right, it must be as close to 5 as possible, and the value 3 is barely acceptable.

The thickening power increases with the molecular weight; the shearing strength, on the contrary, decreases when said molecular weight increases; it is therefore imperative to have a set molecular weight and a polydispersity index as close to 1 as possible.

As operation is carried out in bulk, polydispersities of about 2 to 2.5 will be attained according to the invention.

In one embodiment, said copolymer is mixed with a styrene copolymer, for example in a ratio of 90/10 to 50/50 by weight. An antioxidant may also be added to said additive.

The method for preparing such additives consists in a bulk polymerization, in the presence of radical catalyst(s), of the total quantity of styrene derivative and of esters of methacrylic acid after dissolution in a minimum quantity of solvent.

This method will be described in detail hereinafter.

The main advantage of the invention is that these new copolymers have the properties required for improving the quantities of the oil, in particular the VIE and the pour point (cf. Table II hereinafter).

Furthermore, these new copolymers are compatible by being simply mixed with other copolymers such as styrene polymers; the thickening power of these new copolymers is thus improved, whilst maintaining their intrinsic properties.

Another advantage is their method for preparation which is simpler, shorter than in the prior art and as a result less expensive.

Such additives are also more economical due to the very nature of the starting components and to their preparation cost. They may be proposed in the crude state or dissolved in a vehicle oil. They find an application in the formulation of motor and hydraulic oils.

The invention will be more readily understood on reading the following description and examples given by way of non-limiting example.

The additives are copolymers obtained from the following monomers:
(1) styrene, substituted or non-substituted, for example by a lower alkyl group, in proportions by weight with respect to the total weight of the components, of 35 to 55% and preferably 40 to 50%.
(2) at least one heavy $C_{12}$–$C_{20}$ alkyl ester of methacrylic acid, in proportions by weight with respect to the total weight of the components, of 65 to 45%, and preferably 60 to 50%.

The heavy ester or esters of methacrylic acid contain at least 80% by weight of $C_{16}$–$C_{20}$ alkyl ester of methacrylic acid with respect to the total weight of the heavy alkyl esters of methacrylic acid. These are natural or synthetic heavy alcohol esters of methacrylic acid.

It is possible, when using heavy $C_{16}$–$C_{20}$ esters of methacrylic acid, to lower the parameter of solubility of the final copolymer and thus to increase the thickening power thereof.

The above additives according to the invention, of the terpolymer type, may very advantageously be modified by bulk copolymerization of an additional comonomer, which gives a tetrapolymer, then by simultaneous double grafting of this tetrapolymer by vinyl monomers.

Said additional comonomer will be selected from the dialkylaminoalkyl esters of methacrylic acid, and used in a proportion of 0.5 to 5% with respect to the total weight of the components.

The best results were obtained with the dimethylaminoethyl ester of methacrylic acid used at a rate of about 1% by weight with respect to the total weight of the components.

Said vinyl monomers will be selected from the derivatives containing a nitrogen function, and in particular N-vinylpyrrolidone, N-vinylimidazole and N-vinyl-2H-pyridine, at a rate of 1 to 3% of the total weight of the components.

The best results were obtained with the combination of the N-vinylpyrrolidone and the N-vinylimidazole in a ratio of about 1/1 to 2/1.

A typical formulation of modified additive, which gives excellent results, is as follows:
for 100 parts by weight of tetrapolymer (or for 100 parts by weight of the modified additive):
1% by weight of MADAME (ester of methacrylic acid and dimethylaminoethanol) bulk copolymerized;
1% by weight of N-vinylpyrrolidone and 0.5% by weight of N-vinylimidazole then grafted simultaneously.

It will be noted that it is essential for the nitrogeneous ester of methacrylic acid to be bulk copolymerized with the monomers of the terpolymer described hereinabove (according to a modus operandi described in detail hereinafter) and for the vinyl monomers to be grafted simultaneously thereafter.

If one of these conditions is not fulfilled, for example if the nitrogeneous ester of methacrylic acid is grafted, mediocre results are obtained.

This is shown by Table III hereinafter in which the basic terpolymer contains in relative % 50% MACe, 10% MAlau and 40% styrene (Pe 529).

Tests LCMc 1316 and 1320 show that the nitrogeneous ester of methacrylic acid must be imperatively bulk polymerized and not grafted.

Test Pe 538, despite the absence of NVI, may appear interesting; in fact, it corresponds to 4% of modifying agents and is therefore very expensive. This quantity of 4% is impossible to reduce, as shown by test LCMc 1309.

Tests P 573 to LCMc 1339 are therefore the only ones to correspond to very good, inexpensive products.

The modified additives with dispersing properties, according to the invention, are therefore specific by their composition, method for preparation and their properties.

These additives, i.e. the terpolymers of styrene and of heavy esters of methacrylic acid or their modified form, (doubly grafted tetrapolymers) are physically compatible with the copolymers which are known for their excellent thickening power such as those based on styrene: hydrogenated styrene/isoprene, hydrogenated styrene/butadiene, styrene/isobutene copolymers. Contrary to the prior art, such a styrene copolymer need not be subjected to a chemical reaction in order to obtain a homogeneous product. In the present case, the two copolymers are simply mixed together. This property offers the advantage of proposing products with a reinforced thickening power or of allowing the user to make his own mixture if the need arises.

An extremely advantageous "mixture" will be that of the modified form of the additive according to the invention (i.e. grafted tetrapolymer) and of one of the styrene copolymers indicated hereinabove, since the latter present in fact no dispersing power, which is in that case brought into the "mixture" by the modified additive according to the invention.

According to another variant, a conventional antioxidant may be added to the copolymers, in known manner.

According to the invention, the method used for obtaining the terpolymers consists in a radical bulk polymerization with virtually no solvent. A minimum of solvent is used, less in any case than in the prior art which uses about 30% of the weight of the starting components. In the present method, on the contrary, no more than 5-10% by weight of solvent is used in relation to the total weight of the starting monomers so that the solvent has but little effect on the polymerization.

This polymerization and the percentages of starting monomers make it possible to obtain a final copolymer of which the styrene-ester of methacrylic acid moieties are linked as regularly as possible, tending towards a uniform distribution of the moieties as a function of the proportions of the monomers.

The weight mean of molecular weight of the final copolymer is between 80 000 and 200 000 (measured by the G.P.C. method, with standard polystyrene), its polydispersity is as low as possible, and its parameter of solubility as close as possible to the parameter of solubility of the oil and of the other possible additives, i.e. generally around 8.

The copolymers obtained are in compact mass form, and can be sold either in the crude state or dissolved in the oil with, as a variant, presentation as a mixture with a styrene copolymer. Mixtures of additive (or modified additive) with styrene polymer are between about 90/10 and 50/50 by weight. Table IV shows the viscosity at 100° C. (in mm2/s or cSt) of a mixture of additive Pe 529 (cf. Table 1) and of hydrogenated styrene-isoprene, in the proportion of 3% in 200 NEUTRAL oil, as a function of the relative percentage of hydrogenated styrene-isoprene in the mixture. The shearing rate $\tau$ is clearly lower than that of the known polyesters of methacrylic acid.

The application of such a copolymer to the improvement of lubricating oils, such as for example those marketed under the name "150 Neutral", "200 Neutral", is achieved by adding from 1 to 5% of the weight of copolymer of styrene and ester of methacrylic acid with respect to the total weight, to obtain the final viscosity required for the oil treated this way, for example about 14 cSt at 100° C. for the "200 Neutral" oil.

The terpolymers according to the invention are prepared in the following manner: the monomers have a quantity of toluene (or another equivalent light solvent) equal to 10% of the total weight of the monomers, and about 3 °/∞ of an adequate radical catalyst, such as azobisobutyronitrile (AIBN), added thereto. One tenth of this reaction mass is introduced, in a neutral atmosphere (and particularly in a nitrogen atmosphere), into a reactor and taken to about 85° C., with stirring, then the rest of the initial reactional mass is poured in two to three hours. The temperature is maintained at about 85° C. for one hour after the end of the flow. The bulk temperature is taken to about 125° C., and a radical end-of-polymerization catalyst, of the tertiary butyl perbenzoate type, is then added in the proportions known to the man skilled in the art. The reaction is then finished. The toluene is finally distilled under reduced pressure, the bulk temperature being progressively taken towards 140° C. The resin is cast hot.

To prepare the doubly grafted tetrapolymers, the following modus operandi is preferably carried out:
  bulk polymerization of the four monomers forming the tetrapolymer, according to the above-described technique for the terpolymers, but with only 4/5 of the quantity of the catalyst, then
  reactivation of the macromolecular chains by the last 1/5th of the quantity of the catalyst,
  addition of the mixture of the vinyl monomers (particularly NVP and NVI).
  heating to 125° C. and termination of the reaction as described hereinabove.

A variant of this method consists, instead of effecting the temperature rise to 125° C. and adding the end-of-polymerization catalyst, in remaining for a longer time at 85° C., without adding any end-of-polymerization catalyst, but continuing the addition of portions of AIBN. Properties are then obtained which may be slightly modified.

The toluene is distilled and the resin is cast as beforehand.

Two examples of dispersing powers will be found hereinbelow which may be obtained under these conditions according to the invention:
  Modified additive Pe 611 (tetrapolymer 50-10-40% of MACe, MALau and styrene respectively, 1% MADAME and 1 and 0.5% respectively of NVP and NVl:
    alone: spot test, 5 5 5 4+
    80%/20% mixture of Pe 611 and of "SHELLVIS" (hydrogenated styrene/isoprene copolymer); spot test, 5 5 5 4

The heavy alkyl esters of methacrylic acid used are a mixture containing "impurities": for examples, in the composition of $C_{12}$–$C_{15}$ alkyl esters of methacrylic acid, it is possible to find $C_{10}$–$C_{11}$ and/or $C_{16}$ compounds which do not exceed 3%, and in that of the $C_{16}$–$C_{20}$ alkyl esters of methacrylic acid, the presence is detected of $C_{12}$–$C_{14}$ compounds in an overall proportion of 6% at the most.

The invention is in no way limited to the products and method described hereinabove, and, on the contrary, covers any modifications which can be made thereto by the man skilled in the art, without departing from the scope thereof.

TABLE I

| | | | | | | | |
|---|---|---|---|---|---|---|---|
| Influence of the composition on the thickening power and the rate of shearing | | | | | | | |
| Test | MA Ce | MA Lau | A 2EH | Styrene | Mw | E | $\tau$ |
| Pe 511 | 75 | | | 25 | 183450 | 3.6 | 26.6 |
| Pe 522 | 50 | | 25 | 25 | 106470 | 5.5 | 6 |
| Pe 524 | | 50 | | 50 | 101280 | 5.5 | 5.4 |
| Pe 525 | 60 | | | 40 | 209800 | 4.1 | 14.5 |
| Pe 526 | 50 | | | 50 | 151400 | 4.7 | 13.3 |
| Pe 529 | 50 | 10 | | 40 | 169400 | 4.3 | 9 |
| LCMc1295 | 50 | 10 | | 40 | 188800 | 4.1 | 11.2 |
| Pe 548 | 30 | 30 | | 40 | 174800 | 5 | 7.6 |

TABLE II

| Test | VIE | Pour point (0.3%/200 N) |
| --- | --- | --- |
| Pe 525 | (1.8%) 136 | −36 |
| Pe 526 | (2%) 138.5 | −30 |
| Pe 529 | (1.9%) 134 | −30 |

TABLE III

| Test | MAD-AME % (bulk polymerized) | Dispersing character MAD-AME % (grafted) | NVP % (grafted) | NVI % (graft-grafted) | Spot test |
| --- | --- | --- | --- | --- | --- |
| Pe 531 | | | | 4 | 0 0 0 0 |
| Pe 541 | | | | 2 | 0 0 0 0 |
| LCMc 1299 | | | | 4 | 5 4+3 3 |
| LCMc 1307 | | | | 2 | 4 3+3+2 |
| Pe 538 | 2 | | 2 | | 5 5 5 4 |
| LCMc 1309 | 1 | | 1 | | 5 5 1 1 |
| Pe 559 | 2 | | | 2 | 5 4 4 1 |
| LCMc 1316 | 4 | | | | 5 5 4 1 |
| LCMc 1320 | | 4 | | | 2 2 2 0 |
| Pe 567 | 2 | | 1 | 0.5 | 5 5 5 4 |
| Pe 573 | 1 | | 1 | 0.5 | 5 5 5 4 |
| LCMc 1337 | 1 | | 1 | 0.5 | 5 5 5 4 |
| Pe 574 | 1 | | 1 | 0.5 | 5 5 5 4 |
| LCMc 1339 | 1 | | 1 | 0.5 | 5 5 5 4 |

TABLE IV

Properties of mixtures Pe 529/"SHELLVIS 50"

| Test | "SHELLVIS" % | η (mm 2/s) | E | μ (mm 2/s) | τ |
| --- | --- | --- | --- | --- | --- |
| LCMc 1305/1 | 75 | 37.4 | | | |
| LCMc 1305/2 | 60 | 25.2 | 1.7 | 13.50 | 4.25 |
| LCMc 1305/3 | 50 | 20.8 | 2 | 13.80 | 6 |
| LCMc 1305/4 | 40 | 17.5 | 2.3 | 13.92 | 6.7 |
| LCMc 1305/5 | 25 | 14.6 | 2.9 | 14.05 | 6.8 |
| LCMc 1305/7 | 10 | 12.1 | 3.85 | 14.01 | 9 |
| Pe 529 | 0 | 11.4 | 4.3 | 13.98 | 9 |

η = viscosity at 100° C. of a solution at 3% of active matter.
μ = viscosity at 100° C. of the solution corresponding to the thickening power.

What is claimed is:

1. An additive for lubricating oils, comprising a random copolymer consisting of a polymerized mixture of styrene or lower alkyl-substituted styrene, at least one $C_{12}$–$C_{20}$ alkyl ester of methacrylic acid selected from the group consisting of $C_{12}$–$C_{15}$ alkyl esters of methacrylic acid and $C_{16}$–$C_{20}$ alkyl esters of methacrylic acid, and an ester of methacrylic acid selected from the group consisting of dialkylaminoalkyl esters of methacrylic acid;
said copolymer in addition having grafted onto it at least one dispersing monomer selected from the group consisting of N-vinylpyrrolidone, N-vinylimidazole, N-vinyl-2H-pyridine, and other N-vinyl monomers containing a nitrogen function, thereby producing a modified copolymer;
said alkyl esters of methacrylic acid containing at least 80% by weight of the $C_{16}$–$C_{20}$ alkyl esters of methacrylic acid relative to the total alkyl esters of methacrylic acid employed;
said modified copolymer containing between 35 and 55% by weight of styrene or lower alkyl-substituted styrene, and having a polydispersity of from 1 to about 2.5, a solubility parameter of about 8, and a weight average molecular weight between 80,000 and 200,000.

2. The additive of claim 1, wherein the percentage of styrene monomer, expressed by weight and in relation to the total weight of the monomers, is between 40 and 50%.

3. The additive of claim 1 wherein the dialkylaminoalkyl ester of methacrylic acid constitutes 0.5 to 5% of the total weight of the components and the dispersing monomers, taken together, constitute 1 to 3% of the total weight of the components.

4. The additive of claim 1 wherein the dispersing monomers are N-vinylpyrrolidone and N-vinylimidazole, used in a ratio of between 1/1 and 2/1.

5. The additive of claim 1 wherein the dialkylaminoalkyl ester of methacrylic acid is dimethylaminoethylmethacrylate, used in the modified copolymer at a level of 1% by weight, and the dispersing grafted-on monomers are N-vinylpyrrolidone, used in the modified copolymer at a level of 1% by weight, and N-vinylimidazole, used in the modified copolymer at a level of 0.5% by weight.

6. The additive of claim 1 further comprising an efficient quantity of an antioxidant.

7. An additive for lubricating oils comprising a random copolymer consisting of a polymerized mixture of styrene, laurylmethacrylate, cetylmethacrylate, and dimethylaminoethylmethacrylate;
said copolymer in addition having grafted onto it dispersing monomers N-vinylpyrrolidone and N-vinylimidazole, thereby providing a modified copolymer;
said cetylmethacrylate consisting of at least 80% of the total weight of the cetylmethacrylate and the laurylmethacrylate employed;
said modified copolymer containing between 35 and 55% by weight of styrene, and having a polydispersity of from 1 to about 2.5, a solubility parameter of about 8, and a weight average molecular weight between 80,000 and 200,000.

8. The additive of claim 7 wherein the percentage of styrene monomer, expressed by weight and in relation to the total weight of the monomers, is between 40 and 50%.

9. The additive of claim 7 wherein the dimethylaminoethylmethacrylate constitutes from 0.5 to 5% of the total weight of the components and the N-vinyl pyrrolidone and N-vinylimidazole taken together constitute to 1 to 3% of the total weight of the components.

10. The additive of claim 7, wherein the dispersing monomers N-vinylpyrrolidone and N-vinylimidazole are used in a ratio of between 1/1 and 2/1.

11. The additive of claim 7 wherein said dimethylaminoethylmethacrylate is used in the modified copolymer at a level of 1% by weight, the N-vinylpyrrolidone is used in the modified copolymer at a level of 1% by weight, and the N-vinylimidzole is used in the modified copolymer at a level of 0.5% by weight.

12. The additive of claim 7 further comprising an efficient quanity of an antioxidant.

13. An additive for lubricating oils comprising:
a random copolymer consisting of a polymerized mixture of styrene, cetylmethacrylate, and laurylemethacrylate in the proportions 4:5:1 by weight respectively, said mixture also including dimethylaminoethylmethacrylate at a level of 1% by weight with respect to the combined weight of said mixture of styrene, cetylmethacrylate, and laurylmethacrylate to produce a tetrapolymer;

and tetrapolymer in addition having grafted onto it dispersing monomers N-vinylpyrrolidone and N-vinylimidazole at levels of 1% and 0.5% by weight of the tetrapolymer, respectively.

14. Mixtures for improving lubricating oils, comprising:

the polymeric additive of claim 1 mixed with a second polymer possessing thickening power and selected from the group of copolymers consisting of hydrogenated styrene-isoprene, hydrogenated styrene-butadiene, and styrene-isobutene, the ratio of additive to said second polymer being 90/10 to 50/50 by weight.

15. Mixtures for improving lubricating oils, comprising:

the polymeric additive of claim 7 mixed with a second polymer possessing thickening power and selected from the group of copolymers consisting of hydrogenated styrene-isoprene, hydrogenated styrene-butadiene, and styrene-isobutene, the ratio of additive to said second polymer being 90/10 to 50/50 by weight.

16. Mixtures for improving lubricating oils, comprising:

the polymeric additive of claim 13 mixed with a second polymer possessing thickening power and selected from the group of copolymers consisting of hydrogenated styrene-isoprene, hydrogenated styrene-butadiene, and styrene-isobutene, the ratio of additive to said second polymer being from 90/10 to 50/50 by weight.

17. Additives for lubricating oil, prepared by a process comprising the following steps:

polymerizing a mixture of styrene or a lower alkyl-substituted styrene, at least one $C_{12}$–$C_{20}$ alkyl ester of methacrylic acid selected from the group consisting of $C_{12}$–$C_{15}$ alkyl esters of methacrylic acid and $C_{16}$–$C_{20}$ alkyl esters of methacrylic acid, and an ester of methacrylic acid selected from the group consisting of dialkylaminoalkyl esters of methacrylic acid, said alkyl esters of methacrylic acid containing at least 80% by weight of the $C_{16}$–$C_{20}$ alkyl esters of methacrylic acid relative to the total alkyl esters of methacrylic acid employed, the polymerization being carried out in bulk, in 10% or less by weight of solvent, in the presence of a radical-producing catalyst such as azobisisobutyronitrile, under an inert atmosphere, at about 85° C., for at least one hour after the reagents have been combined, thereby producing a tetrapolymer;

adding a fresh portion of the catalyst in an amount approximately 20% of the amount of catalyst used in the copolymerization reaction, subsequent to the copolymerization reaction, to reactivate the polymer chains;

adding at least one additional monomer selected from the group consisting of N-vinylpyrrolidone, N-vinylimidazole, N-vinyl-2H-pyridine, and other N-vinyl monomers containing a nitrogen function, thereby producing grafting onto said tetrapolymer chains;

raising the temperature of the reaction mixture to about 125° C. and adding a higher-temperature finishing catalyst such as tertiarybutylperbenzoate;

distilling off solvent under reduced pressure as the temperature is further raised to about 140° C.

18. A process for synthesizing additives for lubricating oils, comprising the following steps:

polymerizing a mixture of styrene or a lower alkyl-substituted styrene, at least one $C_{12}$–$C_{20}$ alkyl ester of methacrylic acid selected from the group consisting of $C_{12}$–$C_{15}$ alkyl esters of methacrylic acid and $C_{16}$–$C_{20}$ alkyl esters of methacrylic acid, and an ester of methacrylic acid selected from the group consisting of dialkylaminoalkyl esters of methacrylic acid, said alkyl esters of methacrylic acid containing at least 80% by weight of the $C_{16}$–$C_{20}$ alkyl esters of methacrylic acid relative to the total alkyl esters of methacrylic acid employed, the polymerization beng carried out in bulk, in 10% or less by weight of solvent, in the presence of a radical-producing catalyst such as azobisisobutyronitrile, under an inert atmosphere, at about 85° C., for at least one hour after the reagents have been combined, thereby producing a tetrapolymer;

adding a fresh portion of the catalyst in an amount approximately 20% of the amount of catalyst used in the copolymerization reaction, subsequent to the copolymerization reaction, to reactivate the polymer chains;

adding at least one additional monomer selected from the group consisting of N-vinylpyrrolidone, N-vinylimidazole, N-vinyl-2H-pyridine, and other N-vinyl monomers containing a nitrogen function, thereby producing grafting onto said tetrapolymer chains;

raising the temperature of the reaction mixture of about 125° C. and adding a higher-temperature finishing catalyst such as tertiarybutylperbenzoate;

distilling off solvent under reduced pressure as the temperature is further raised to about 140° C.

* * * * *

UNITED STATES PATENT AND TRADEMARK OFFICE
CERTIFICATE OF CORRECTION

PATENT NO. : 4,496,691
DATED : January 29, 1985
INVENTOR(S) : Yves Proux; Alain Perron It is certified that error appears in the above-identified patent and that said Letters Patent is hereby corrected as shown below:

Column 2, Line 11    "and a a" should read --and a--

Column 5, Lines 60-61    "azobisobutyronitrile" should read --azobisisobutyronitrile--

Column 6, Line 36    "NV1" should read --NVI--

Line 39    "copolymer);" should read --copolymer):--

Column 7, Table III Column Headings 4th Col.    "NVP% ted)" should read --NVP% (grafted)--

Column 7, Table III 5th Col. Heading    "NV1% (graft-(grafted)" should read --NV1% (grafted)--

Column 7, Table III Last line under Spot Test heading    numbers 5554 are correct but out of line with rest of figures Column 8, Line 50    "constitute to 1" should read --constitute 1--

UNITED STATES PATENT AND TRADEMARK OFFICE
CERTIFICATE OF CORRECTION

PATENT NO. : 4,496,691                    Page 2 of 2

DATED      : January 29, 1985

INVENTOR(S): Yves Proux; Alain Perron

It is certified that error appears in the above-identified patent and that said Letters Patent is hereby corrected as shown below:

Column 8, Line 58      "N-vinylimidzole" should read --N-vinylimidazole--

Column 10, Line 30     "beng" should read --being--

Column 10, Lines 47-48 "mixture of about" should read --mixture to about--

Signed and Sealed this

Twenty-eighth Day of October, 1986

[SEAL]

Attest:

DONALD J. QUIGG

Attesting Officer    Commissioner of Patents and Trademarks